United States Patent
Feniello et al.

(10) Patent No.: US 9,737,990 B2
(45) Date of Patent: Aug. 22, 2017

(54) PROGRAM SYNTHESIS FOR ROBOTIC TASKS

(71) Applicant: MICROSOFT TECHNOLOGY LICENSING, LLC, Redmond, WA (US)

(72) Inventors: Ashley Nathan Feniello, Duvall, WA (US); Stan Birchfield, Sammamish, WA (US); Hao Dang, Redmond, WA (US); Sumit Gulwani, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 358 days.

(21) Appl. No.: 14/280,187

(22) Filed: May 16, 2014

(65) Prior Publication Data
US 2015/0331416 A1   Nov. 19, 2015

(51) Int. Cl.
*G06F 15/18* (2006.01)
*B25J 9/16* (2006.01)
*G06N 99/00* (2010.01)

(52) U.S. Cl.
CPC .......... *B25J 9/1661* (2013.01); *B25J 9/1656* (2013.01); *G06N 99/005* (2013.01); *G05B 2219/40518* (2013.01)

(58) Field of Classification Search
None
See application file for complete search history.

(56) References Cited

U.S. PATENT DOCUMENTS 5,946,673 A    8/1999  Francone et al.
6,462,499 B2   10/2002 Mukai
(Continued)

FOREIGN PATENT DOCUMENTS

EP    0086848 A1     8/1983
JP    2013059817 A   4/2013
(Continued)

OTHER PUBLICATIONS

Akkiraju et al. "SEMAPLAN: Combining Planning with Semantic Matching to Achieve Web Service Composition", ICWS, 2006, pp. 8.*

(Continued)

*Primary Examiner* — Li-Wu Chang
(74) *Attorney, Agent, or Firm* — Lyon & Harr, LLP; Richard T. Lyon

(57) ABSTRACT

Robotic task program synthesis embodiments are presented that generally synthesize a robotic task program based on received examples of repositioning tasks. In one implementation, the exemplary repositioning tasks are human demonstrations of object manipulation in an actual or displayed robot workspace. A domain specific language (DSL) designed for object repositioning tasks is employed for the robotic control program. In general, candidate robotic task programs are generated from the example tasks. Each candidate program includes instructions for causing the robot to reposition objects, and represents a different permutation of instructions consistent with the received example tasks. The candidate programs are ranked, and whenever the top ranking program accomplishes the repositioning specified in each example task, it is designated as the synthesized robotic task program.

20 Claims, 9 Drawing Sheets

(56) References Cited

U.S. PATENT DOCUMENTS

| | | |
|---|---|---|
| 7,328,196 B2 | 2/2008 | Peters, II |
| 7,881,917 B2 | 2/2011 | Nagatsuka et al. |
| 2009/0187276 A1 | 7/2009 | Nagatsuka et al. |
| 2012/0053728 A1 | 3/2012 | Theodorus et al. |
| 2013/0116828 A1 | 5/2013 | Krause et al. |
| 2013/0151442 A1 | 6/2013 | Suh et al. |
| 2013/0218335 A1 | 8/2013 | Barajas et al. |
| 2013/0245824 A1* | 9/2013 | Barajas .................. B25J 9/1664 700/253 |
| 2013/0275091 A1 | 10/2013 | Peterson et al. |
| 2016/0042511 A1* | 2/2016 | Chukka ................. G06T 7/0012 382/133 |

FOREIGN PATENT DOCUMENTS

| | | |
|---|---|---|
| WO | 03006215 A2 | 1/2003 |
| WO | 2011039542 A1 | 4/2011 |
| WO | 2013192490 A2 | 12/2013 |

OTHER PUBLICATIONS

"International Search Report & Written Opinion Issued in PCT Application No. PCT/US2015/030691", Mailed Date: Oct. 20, 2015, 14 Pages.

Gottipolu, et al., "A Simplified and Efficient Representation for Evaluation and Selection of Assembly Sequences", In Journal Computers in Industry. vol. 50, Issue 3, Apr. 1, 2003, pp. 251-264.

Abbeel, P., A. Y. NG, Apprenticeship learning via inverse reinforcement learning, Proceedings of the Twenty-first International Conference on Machine Learning, ICML 2004, Jul. 4-8, 2004, Banff, Alberta, Canada.

Ahmadzadeh, S. R., P. Kormushev, D. G. Caldwell, Visuospatial skill learning for object reconfiguration tasks, Int'l Conf. on Intelligent Robots and Sys's, IROS 2013, Nov. 3-7, 2013, pp. 685-691, Tokyo, Japan.

Akgun, B., M. Cakmak, K. Jiang, A. L. Thomaz, Keyframe-based learning from demonstration—Method and evaluation, Int'l J. of Social Robotics, Jan. 2012, vol. 4, No. 4, pp. 343-355.

Amor, B., D. Vogt, M. Ewerton, E. Berger, B. Jung, J. Peters, Learning responsive robot behavior by imitation, IEEE Int'l Conf. on Intelligent Robots and Sys's, (IROS), Nov. 3, 2013, 8 pages.

Argall, B., S. Chernova, M. M. Veloso, B. Browning, A survey of robot learning from demonstration, Robotics and Autonomous Systems, May 2009, vol. 57, No. 5, pp. 469-483.

Atkeson, C. G., S. Schaal, Robot learning from demonstration, Proc. of the Fourteenth Int'l Conf. on Machine Learning, ICML 1997, Jul. 8-12, 1997, pp. 12-20, Nashville, Tennessee, USA.

Bandera, J. P., L. Molina-Tanco, J. A. Rodriguez, A. Bandera, Architecture for a robot learning by imitation system, 15th IEEE Mediterranean Electrotechnical Conf. MELECON, Apr. 26, 2010, pp. 87-92.

Billard, A., S. Calinon, R. Dillmann, S. Schaal, Robot programming by demonstration, Springer Handbook of Robotics, Jan. 3, 2008, pp. 1371-1394.

Brunner, B., K. Arbter, G. Hirzinger, R. Koeppe, Programming robots via learning by showing in a virtual environment, Stuttgart, Feb. 1995, pp. 8.

Cakmak, M., Guided teaching interactions with robots: Embodied queries and teaching heuristics, Ph.D. Thesis, Georgia Institute of Technology, Atlanta, May 2012, pp. 1-299.

Cakamak. M., C. Chao, A. L. Thomaz, Designing interactions for robot active learners, IEEE Transactions on Autonomous Mental Development, Mar. 2010, pp. 108-118.

Calinon, S., A. Billard, Incremental learning of gestures by imitation in a humanoid robot, Proc. of the Second ACM SIGCHI/SIGART Conf. on Human-Robot Interaction, HRI 2007, Mar. 10-12, 2007, pp. 255-262 Arlington, Virginia, USA.

Calinon, S., F. Guenter, A. Billard, On learning, representing, and generalizing a task in a humanoid robot, IEEE Transactions on Systems, Man, and Cybernetics, Part B, Apr. 2007, vol. 37, No. 2, pp. 286-298.

Chao, C., M. Cakmak, A. L. Thomaz, Towards grounding concepts for transfer in goal learning from demonstration, Proc. of the Joint IEEE Int'l Conf. on Development and Learning and on Epigenetic Robotics, ICDL-EpiRob, Aug. 24-27, 2011, pp. 1-6.

Dantam, N., I. A. Essa, M. Stilman, Linguistic transfer of human assembly tasks to robots, Int'l Conf. on Intelligent Robots and Sys's, IROS 2012, Oct. 7-12, 2012, pp. 237-242, Vilamoura, Algarve, Portugal.

Gabelaia, D., R. Kontchankov, Á. Kurucz, F. Wolter, M. Zakharyaschev, Combining spatial and temporal logics: Expressiveness vs. complexity, J. Artif. Intell. Res. (JAIR), Feb. 2005, pp. 167-243, vol. 23.

Gulwani, S., Automating string processing in spreadsheets using input-output examples, Proc. of the 38th ACM SIGPLAN-SIGACT Symposium on Principles of Programming Languages, POPL 2011, Jan. 26-28, 2011, pp. 317-330, Austin, TX, USA.

Gulwani, S., W. R. Harris, R. Singh, Spreadsheet data manipulation using examples, Commun. ACM, Aug. 2012, pp. 97-105, vol. 55, No. 8.

Harris, W. R., S. Gulwani, Spreadsheet table transformations from examples, Proc. of the 32nd ACM SIGPLAN Conf. on Programming Language Design and Implementation, PLDI 2011, Jun. 2011, pp. 317-328, San Jose, CA, USA.

Idaho National Laboratory, Behavior-Based Robotics, Dec. 28, 2010, retrieved from https://inlportal.inl.gov/portal/server.pt?CommunityID=534&spaceID=42&parentname=&control=SetCommunity&parentid=&in_hi_userid= 3338 &PageID=0&space=CommunityPage, pp. 3.

Jetchev, N., T. Lang, M. Toussaint, Learning grounded relational symbols from continuous data for abstract reasoning, ICRA Workshop on Autonomous Learning, May 2013, pp. 7.

Konidaris, G. D., S. R. Kuindersma, R. A. Grupen, A. G. Barto, Int'l J. of Robotics Research, Mar. 2012, vol. 31, No. 3, pp. 360-375.

Kulick, J., M. Toussaint, T. L. Freie, M. Lopes, Active learning for teaching a robot grounded relational symbols, Proc. of the Twenty-Third Int'l Joint Conf. on Artificial Intelligence, Aug. 2013, pp. 1451-1457.

Lopes. M., J. Santos-Victor, Visual learning by imitation with motor representations, IEEE Transactions on Systems, Man, and Cybernetics, Part B, Jun. 2005, vol. 35, No. 3, pp. 438-449.

Montesano, L., M. Lopes, A. Bernardino, J. Santos-Victor, Learning object affordances: From sensory-motor coordination to imitation, IEEE Transactions on Robotics, Feb. 2008, vol. 24, No. 1, pp. 15-26.

Niekum, S., S. Chitta, A. G. Barto, B. Marthi, S. Osentoski, Incremental semantically grounded learning from demonstration, Robotics: Science and Systems 2013 Robotics: Science and Systems IX, Jun. 2013, pp. 8, Technische Universitat Berlin, Berlin, Germany.

Pais, A. L., B. Argall, A. Billard, Assessing interaction dynamics in the context of robot programming by demonstration, Int'l J. of Social Robotics, Nov. 2013, pp. 477-490, vol. 5, No. 4.

Phillips, M., V. Hwang, S. Chitta, M. Likhachev, Learning to plan for constrained manipulation from demonstrations, Robotics: Science and Systems, Jun. 2013.

Schaal, S., A. Ijspeert, A. Billard, Computational approaches to motor learning by imitation, Philos. Trans. R. Soc. Lond. B Biol. Sci., Mar. 2003 vol. 358, pp. 537-547.

\* cited by examiner

*value* := *bool* | *float* | *string* | *list* | *rec* | *op*
*list* := [*value**]
*rec* := {(*string, value*)*}
*op* := *primitive* | *compound*
*primitive* := *world* → *world*
*compound* := *list*
*world* := (*state, stack*)
*state* := *value*
*stack* := *list*
*program* := [*value**]

FIG. 3

*primitive* :
swap : $[\sigma^* v_1 v_2] \mapsto [\sigma^* v_2 v_1]$
 drop : $[\sigma^* v] \mapsto [\sigma^*]$
  dup : $[\sigma^* v] \mapsto [\sigma^* v v]$
   dip : $[\sigma^* v [o]] \mapsto [o([\sigma^*]) v]$
    if : $[\sigma^* b [o_1] [o_2]] \mapsto b\ ?\ o_1([\sigma^*]) : o_2([\sigma^*])$
filter : $[\sigma^* l [o]] \mapsto [\sigma^* l']$
        s.t. $l' \subseteq l$ and $\forall e \in l', o(e) = \text{TRUE}$
 eval : $[\sigma^* [o]] \mapsto [o([\sigma^*])]$
 take : $[\sigma^* [l^* \ldots l_2 l_1]\ n] \mapsto [\sigma^* [l_n \ldots l_2 l_1]]$
fetch : $[\sigma^* r p] \mapsto [\sigma^* v]$ where $(p, v) \in r$

*compound* :
 nip : [[drop] dip]
over : [[dup] dip swap]
keep : [over [eval] dip]
  bi : [[keep] dip eval]

FIG. 4 step : $(\psi, [\sigma^*], [v\ \pi^*]) \mapsto$
  $v \in primitive : (\psi, v([\sigma^*]), [\ \pi^*])$
  $v = [v^*] \in compound : (\psi, [\sigma^*], [v^*\ \pi^*])$
  otherwise : $(\psi, [\sigma^*\ v], [\ \pi^*])$ run : $(\psi, [\sigma^*], \pi) \mapsto$
  $\pi = [\ ] :$ return$(\psi, [\sigma^*])$
  otherwise : run(step$(\psi, [\sigma^*], [\ ]))$

FIG. 5

For Each Number In A Sequence Of Numbers Ranging Between Zero And The Total Number Of Objects Associated With The Same Object Filter, Generate A Number-Limited Distribute Primitive That Represents An Instruction For A Robot To Move The Object, As Well As The Aforementioned Number Of Other Objects Associated With The Same Object Filter To A One Of A Prescribed Number Of Distinct Destination Locations (Or Orientations) Where The Distinct Destination Locations (Or Orientations) Include The Distinct Destination Location (Or Orientation) Associated With The Object And The Prescribed Number Of Distinct Destination Locations (Or Orientations) Ranging From Two Up To The Total Number Of Identified Distinct Destination Locations (Or Orientations) Or The Total Number Of Objects Associated With The Same Object Filter, Whichever Is Smaller. ⎯806

FIG. 8B

PROGRAM SYNTHESIS FOR ROBOTIC TASKS

BACKGROUND

Traditionally, tasks to be performed by a robot are programmed by roboticists and are meant to be executed in controlled (caged) environments. More recently, "learning by demonstration" methods have been developed. Learning by demonstration is an important paradigm for teaching robots to carry out tasks. In this paradigm, a robot is taught not by explicit programming but rather by being guided through the task by a human, or alternatively by watching a human perform the task.

Examples of tasks a robot can be taught by demonstration include sorting, kitting and packaging. In sorting tasks, objects that are different from each other are separated based on their features. In kitting tasks, different objects are grouped together as a single unit. In contrast to sorting tasks, kitting tasks do not require separating different objects from each other while organizing them. In packaging tasks, a set of objects are placed at specific locations in a given container.

Many task learning systems (e.g., program synthesis) require a set of examples. In case of robotics domain, this reduces to a human operator specifying the exact trajectories that are to be carried out by the robot for a particular workspace arrangement. This set of example tasks is accomplished via teleoperation and/or direct manipulation of the robot. Once these trajectories are learned, the robot essentially mimics the human operator's demonstrations after sufficiently generalizing them.

SUMMARY

Robotic task program synthesis embodiments described herein generally synthesize a robotic task program based on received examples of repositioning tasks. In one general implementation, the robotic task program is synthesized by first receiving one or more example tasks. Each example task includes a scene-reposition pair. The scene portion of a scene-reposition pair includes a collection of objects characterized by their orientation, location and perceptual object characteristics. This represents a starting configuration of the objects in a workspace associated with a robot. The reposition portion of a scene-reposition pair includes repositioning data for one or more of the objects. The repositioning data for an object includes a destination orientation, or destination location, or both. This data is indicative of a task that it is desired for the robot to perform on various objects in the robot's workspace.

One or more candidate robotic task programs are then generated. In one implementation, each program is in a domain specific language (DSL) tailored to robotic manipulation tasks. Each program includes instructions for causing the robot to reposition one or more of the aforementioned objects, and represents a different permutation of instructions consistent with the received example task or tasks. The one or more candidate robotic task programs generated are then ranked based on the degree to which they would cause the robot to reposition objects in a manner indicated by the scene-reposition pair or pairs of the received example task or tasks.

Whenever the top ranking candidate robotic task program accomplishes the repositioning specified in each of the scene-reposition pairs in the received example task or tasks, it is designated as the aforementioned synthesized robotic task program. However, whenever more than one candidate robotic task program has been generated and the top ranking candidate robotic task program does not accomplish the repositioning specified in each of the scene-reposition pairs in the received example task or tasks, the candidate robotic task programs are combined in multiple ways to create a plurality of combined candidate robotic task programs. The combined candidate robotic task programs are then ranked based on the degree to which a candidate program would cause the robot to reposition objects in a manner indicated by the scene-reposition pair or pairs of the received example task or tasks. It is next determined if the current top ranking combined candidate robotic task program accomplishes the repositioning specified in each of the scene-reposition pairs in the received example task or tasks. If so, the current top ranking combined candidate robotic task program is designated as the synthesized robotic task program. If, however, the current top ranking combined candidate robotic task program does not accomplish the repositioning specified in each of the scene-reposition pairs in the received example task or tasks, then the current combined candidate robotic task programs are combined in multiple ways to create a plurality of new combined candidate robotic task programs. These new combined candidate robotic task programs are ranked based on the degree to which a candidate program would cause the robot to reposition objects in a manner indicated by the scene-reposition pair or pairs of the received example task or tasks. The last four actions are then repeated as appropriate for each new set of combined candidate robotic task programs until the current top ranking combined candidate robotic task program has been designated as the synthesized robotic task program.

It should also be noted that this Summary is provided to introduce a selection of concepts, in a simplified form, that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

The specific features, aspects, and advantages of the disclosure will become better understood with regard to the following description, appended claims, and accompanying drawings where:

FIG. 3 is a domain specific language (DSL) syntax listing.

FIG. 4 is a listing of select DSL operators.

FIG. 5 shows the semantics of DSL execution.

FIGS. 8A-B show a flow diagram illustrating an exemplary embodiment, in simplified form, of a process for populating each of a group of prescribed reposition primitives with an object's distinct destination location (or orientation) and the object filter associated with the object, as part of the process of FIG. 7.

DETAILED DESCRIPTION

Figure 1:
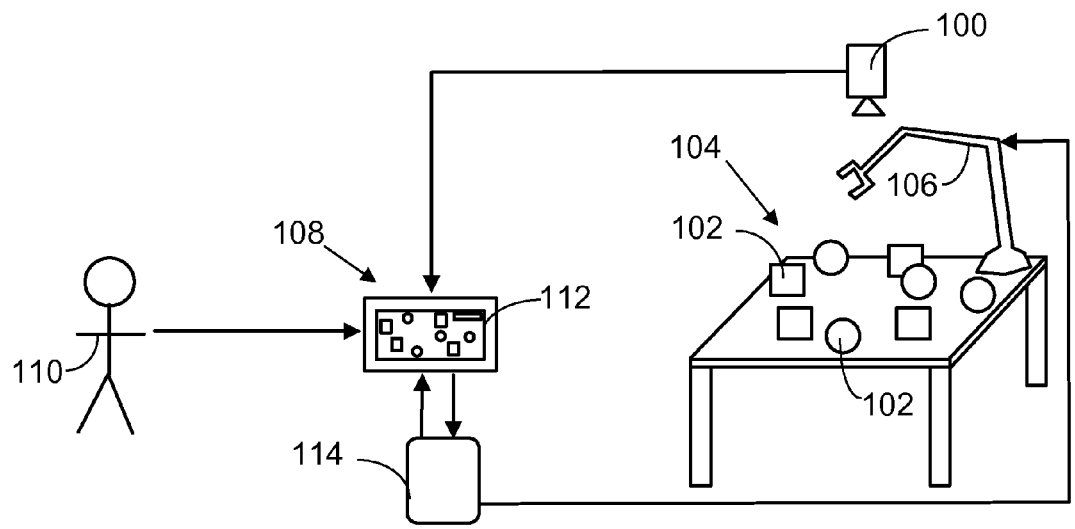
FIG. 1 is a simplified diagram of a suitable environment for practicing robotic task program synthesis embodiments described herein.

In the following description of robotic task program synthesis embodiments reference is made to the accompanying drawings which form a part hereof, and in which are shown, by way of illustration, specific embodiments in which the technique may be practiced. It is understood that other embodiments may be utilized and structural changes may be made without departing from the scope of the robotic task program synthesis.

It is also noted that for the sake of clarity specific terminology will be resorted to in describing the robotic task program synthesis embodiments described herein and it is not intended for these embodiments to be limited to the specific terms so chosen. Furthermore, it is to be understood that each specific term includes all its technical equivalents that operate in a broadly similar manner to achieve a similar purpose. Reference herein to "one embodiment", or "another embodiment", or an "exemplary embodiment", or an "alternate embodiment", or "one implementation", or "another implementation", or an "exemplary implementation", or an "alternate implementation" means that a particular feature, a particular structure, or particular characteristics described in connection with the embodiment or implementation can be included in at least one embodiment of the robotic task program synthesis. The appearances of the phrases "in one embodiment", "in another embodiment", "in an exemplary embodiment", "in an alternate embodiment", "in one implementation", "in another implementation", "in an exemplary implementation", and "in an alternate implementation" in various places in the specification are not necessarily all referring to the same embodiment or implementation, nor are separate or alternative embodiments/implementations mutually exclusive of other embodiments/implementations. Yet furthermore, the order of process flow representing one or more embodiments or implementations of the robotic task program synthesis does not inherently indicate any particular order not imply any limitations.

1.0 Robotic Task Program Synthesis

The robotic task program synthesis embodiments described herein generally synthesize a robotic control program based on received examples of repositioning tasks (e.g. sorting, kitting, or packaging). In one implementation, the exemplary repositioning tasks are human demonstrations of object manipulation in an actual or displayed robot workspace.

A domain specific language (DSL) designed for object repositioning tasks is employed for the robotic control program. This DSL is generally a generic stack-based programming language that can be used to specify a wide range of object repositioning tasks. As will be described in more detail in the sections to follow, a DSL program is found that is consistent with the received examples, and which generalizes to accomplish tasks in a robot workspace even with a different arrangement of objects than were available during training. In addition, this program is synthesized automatically and does not require any programming on the part of the user.

The following sections will provided more detail about the environment and processes involved in implementing the embodiments of the robotic task program synthesis, as well as the aforementioned domain specific language.

1.1 Robotic Task Program Synthesis Environment

Before the robotic task program synthesis embodiments are described, a general description of a suitable environment in which portions thereof may be implemented will be described. Referring to FIG. 1, a digital camera 100 is used to capture images of the workspace 104 of the robot 106. The captured images are used to detect the objects 102 in the workspace 104, along with their perceptual properties, using conventional methods. In addition, a background view of the workspace is derived from the images, also using conventional methods. A computing device 108 having an associated screen display (such as by way of example, and not limitation, a tablet computer having a touch screen display) runs a robotic tasks demonstration interface computer program on which a user 110 demonstrates repositioning tasks in a displayed virtual rendering of the robot's workspace 112. The displayed virtual workspace rendering 112 is generated from the aforementioned workspace background and detected objects. Based on one or more demonstrations, a synthesized program 114 is generated that is used to accomplish the tasks in the actual workspace, even with an arrangement of objects different from the training inputs. It is noted that while the foregoing example environment involves user-provided object repositioning examples, this need not always be the case. For instance, the repositioning examples could be synthesized and/or retrieved from a database of repositioning tasks.

1.2 Robotic Task Program Synthesis Processes

Figure 2:
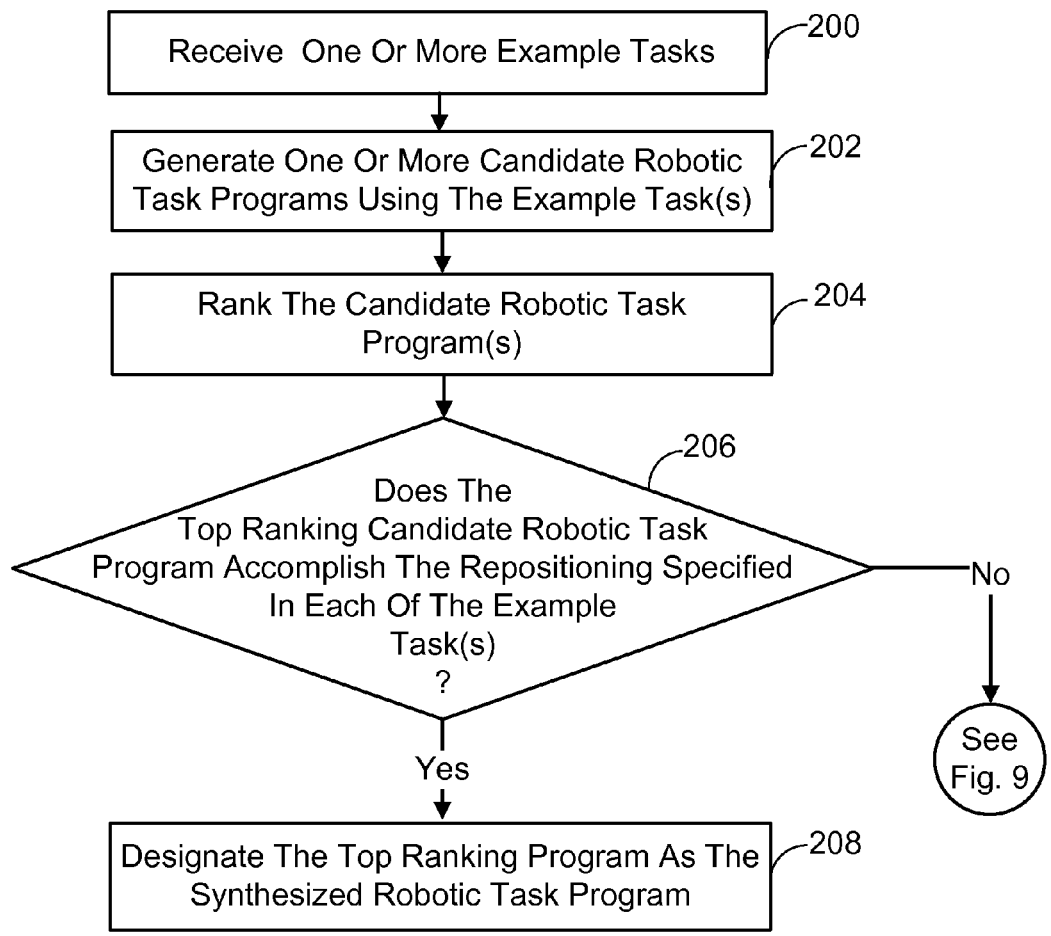
FIG. 2 is a flow diagram illustrating an exemplary embodiment, in simplified form, of a process for synthesizing a robotic task program.

In view of the foregoing, one general implementation of the robotic task program synthesis embodiments described herein is accomplished by using a computing device to perform the following process actions. Referring to FIG. 2, one or more example tasks are received (process action 200). Each example task includes a scene-reposition pair. The scene portion of a scene-reposition pair includes a collection of objects characterized by their orientation, location and perceptual object characteristics. This represents a starting configuration of the objects in a workspace associated with a robot. The reposition portion of a scene-reposition pair includes repositioning data for one or more of the objects. The repositioning data for an object includes a destination orientation, or destination location, or both. This data is indicative of a task that it is desired for the robot to perform on various objectsin the workspace.

Referring to FIG. 2 once again, one or more candidate robotic task programs are generated next (process action 202). As indicated previously, in one implementation each program is in a DSL tailored to robotic manipulation tasks. Each program includes instructions for causing the robot to reposition one or more of said objects in the workspace, and represents a different permutation of instructions consistent with the received example task or tasks. The one or more candidate robotic task programs generated are then ranked based on the degree to which they would cause the robot to reposition objects in a manner indicated by the scene-reposition pair or pairs of the received example task or tasks (process action 204). It is then determined if the top ranking candidate robotic task program accomplishes the repositioning specified in each of the scene-reposition pairs in the received example task or tasks (process action 206). If so, the top ranking program is designated as the aforementioned synthesized robotic task program (process action 208).

An object in the foregoing process is characterized by a set of named properties—namely orientation, location and perceptual object characteristics. With regard to the orientation and location, in one implementation, this pose information is defined by Cartesian coordinates x and y, and a rotation angle θ, i.e., (x, y, θ). This pose scheme assumes a view of the robot workspace from above looking down. It is noted that the coordinates and angle of a pose can be relative to a global coordinate system, or relative to some other location or orientation, or both.

The initial pose and destination pose of an object found in the aforementioned scene-reposition pair is all that is needed to define the repositioning example tasks. With regard to the perceptual object characteristics, these are used to classify objects for a repositioning example (e.g., move the black objects having a particular aspect ratio). The perceptual object characteristics can include (by way of example and not limitation) the size or shape of an object, or its aspect ratio, or its color, or any combination thereof. Some properties are discrete (e.g., dominant color) and can be defined by a single value, while others are continuous (e.g., aspect ratio) and can be defined by a range of values.

Generally, in the foregoing process, one or more example tasks are received. Constrained by these, a program is ultimately synthesized that is consistent with all the example tasks, while remaining as general as possible. Under-specification and ambiguous examples can lead to over-generalization. However, as more example tasks are received, the task description becomes increasingly constrained and less general.

1.3 Domain Specific Language (DSL)

As indicated previously, in one implementation, a stack-based concatenative domain specific language (DSL) for describing object repositioning tasks is employed. This DSL is flexible enough to handle a wide variety of sorting, kitting, and packaging tasks. The idea is to represent the structure of a repositioning task search space as a programming language grammar. This grammar is the DSL tailored to manipulation tasks.

A search within the task search space is carried out by synthesizing permutations of consistent programs and then ranking them against given examples. More particularly, the intent of the user is inferred from one or more received example tasks by searching for the simplest program that achieves the same behavior as the example tasks. The program can then be applied to novel configurations of objects, some of which the system has never seen.

Composing programs from permutations of well-formed pieces by simple concatenation (no formal function arguments to manage) is quite convenient for program synthesis. Internally the execution engine is a simple stack machine. There is a global state and a stack. Each "word" in the DSL consumes and produces a state/stack pair. Value types include numbers, booleans, strings and words (state/stack to state/stack functions), as well as composites of these in the form of lists and records (of name/value maps). Moreover, when implemented in F# the programs are extremely concise, making the approach extensible and flexible. In the following section, one implementation of the syntax and semantics of a base DSL is described, followed by the operators specific to object repositioning.

1.3.1 DSL Syntax

One implementation of the syntax of the DSL is shown in FIG. 3. Note that an asterisk denotes Kleene closure, brackets denote an ordered list, braces denote a set (i.e., an unordered list) and parentheses denote a tuple. The world consists of a state and an evaluation stack (used by the program during execution). The state may consist of any value, but for object repositioning tasks it captures the objects in the workspace, along with their properties. The properties of each object are stored in a rec, which consists of zero or more (string, value) pairs, one per property. The stack is a list of zero or more values, where each value can be either a bool, float, string, or op (operator), or a list or rec to enable complex data to be stored. A program is a list of zero or more values (generally operators or their parameters) that either modify the world directly (through a primitive op) or execute a list of ops (through a compound op). Compound operators are also called "quotations". An operator that takes a quotation as one of its inputs is known as a "combinator".

1.3.2 DSL Semantics

The semantics of selected DSL operators are provided in FIG. 4, where for simplicity the operators that manipulate only the stack while ignoring the state are shown. It is important to note that compound operators need not be named as they are here, but can also exist as anonymous lists of operators, which are simply treated as values on the stack. Several higher order operators consume and execute such values. For example, predicate expressions used to filter a list of objects, selector expressions used to group objects by property (takebygroup), and conditionals executed by if. The semantics of DSL execution are shown in FIG. 5. The meta-operator step takes a world (state, stack [σ*]) and program π=[v π*] and applies the value v at the front of the program: If the value v is a primitive operator (a world-to-world function), then it is applied to the current world; if it is a compound operator, then it is expanded within the program itself; otherwise it is a literal value and is simply pushed onto the stack. In any case step returns the new world and program. The meta-operator run runs a program on a world, returning the new world once the program is empty, or otherwise recursively calling itself on the result of step.

1.3.3 Object Repositioning Syntax and Semantics

For object repositioning, the state is initially populated with the objects and their properties, and the operators either read or modify these properties, or they compute intermediate values. Although in theory it is not necessary to maintain the state separately from the stack, in practice doing so avoids "stack shuffling" and greatly simplifies the formulation and resulting programs.

Repositioning an object is achieved by compound operators such as moveall, which sets the x, y and θ properties contained in the rec of the objects in a list. When a program is played back, each moveall operator causes either the objects to move on a display (in the case of simulation) or the robot to pick up the objects at the previous coordinates and place them at the new coordinates (in the case of physical manipulation). To determine which objects to move, the program filters on the properties. For example, the following program moves all the red objects to the pose (x, y, θ)=(13, 27, 1.57 rad):

things ['color @'red=] filter 13 27 1.57 moveall where things places the list of objects from the state onto the stack, and @ is shorthand for fetch. Note that object properties are either discrete (e.g., the color as shown here) or continuous (e.g., the location or aspect ratio).

Other commands in the DSL include between, which tests that a value is within a certain range; bi, which applies two operators, leaving both results on the stack; moveone, which moves a single object to a specific (x, y, θ) position; take, in the form n take, which takes the first n elements from a list, takeone, which is just [1 take]; takebygroup, which groups the objects in a list by a certain property; and distribute which consumes a list of objects along with a list of poses and distributes the objects across the set of poses.

In designing a language for any domain it is important to recognize that an inherent tradeoff exists between its expressiveness and its complexity. That is, increasing the number and types of commands enables the language to express more interesting concepts but also leads to a combinatorial explosion in the number of possibilities to be explored. Nevertheless, the tradeoff is not always so simple, because increasing expressiveness can also lead to shorter programs, thus facilitating efficient search. As a result, it is important to strike the right balance between the two. The exemplary DSL described herein achieves such a reasonable balance and, moreover, it is extremely easy to extend with new commands as needed.

1.4 Generating Candidate Robotic Task Programs

As indicated previously, the robotic task program synthesis embodiments described herein include generating one or more candidate robotic task programs as part of a program synthesis process. In one implementation, this involves first creating object filters for an object, and then populating each of a group of prescribed reposition primitives with the created object filter and a distinct destination location or orientation. These operations are described in more detail in the sections to follow.

1.4.1 Base Object Filters

A primary facility associated with synthesizing a robotic task program is that of finding appropriate filter expressions. Given a set of objects and a particular subset (e.g., those objects that were moved to a particular location, or distributed across locations), filter expressions are generated to separate them based upon their perceptual object characteristics. First a base set of filters is produced. In one implementation, for discrete values this is simply a set of program fragments for each value in the form:

['property@ value=]

which means "Select objects where property is value."

In one implementation, for continuous values, program fragments are generated to find particular ranges of property values:

['property @ min max between]

which means "Select objects where property is between min and max." Thus, in one implementation, creating a base object filter that identifies objects exhibiting a perceptual object characteristic that falls within a prescribed range of continuous values, involves seeding the foregoing base filter with the simple min/max range for each continuous property within the subset of objects. This min/max range starts with the minimum value of the perceptual object characteristic under consideration as exhibited by objects specified as being repositioned in the reposition portion of the scene-reposition pairs in received example task or tasks, and ending with the maximum value of this perceptual object characteristic exhibited by objects specified as being repositioned in the reposition portion of the scene-reposition pairs in the received example task or tasks.

In another implementation, creating a base object filter that identifies objects exhibiting a perceptual object characteristic that falls within a prescribed range of continuous values, involves seeding the foregoing base filter with ranges identified from clusterings across the superset of objects, thus capturing disjoint ranges. More particularly, a plurality of base object filters are created, each of which identifies objects exhibiting the perceptual object characteristic under consideration that falls within one of a plurality of a clustered ranges of continuous values associated with the aforementioned collection of objects specified in the scene portion of the scene-reposition pairs in the received example task or tasks.

In addition, in one implementation, the negation of the discrete and continuous value base filters are also generated as base filters:

[predicate not].

1.4.2 Combined Object Filters

If one of the base filters happens to select the subset of objects correctly, then the filter creation job is done. However, if this is not the case, the exploration of the search space is continued by combining filters, such as by creating conjunctions, disjunctions, and negations in the forms:

[[filter$_1$] [filter$_2$] bi and]
[[filter$_1$] [filter$_2$] bi or]
[[filter$_1$][not filter$_2$] bi and]

Figure 6:
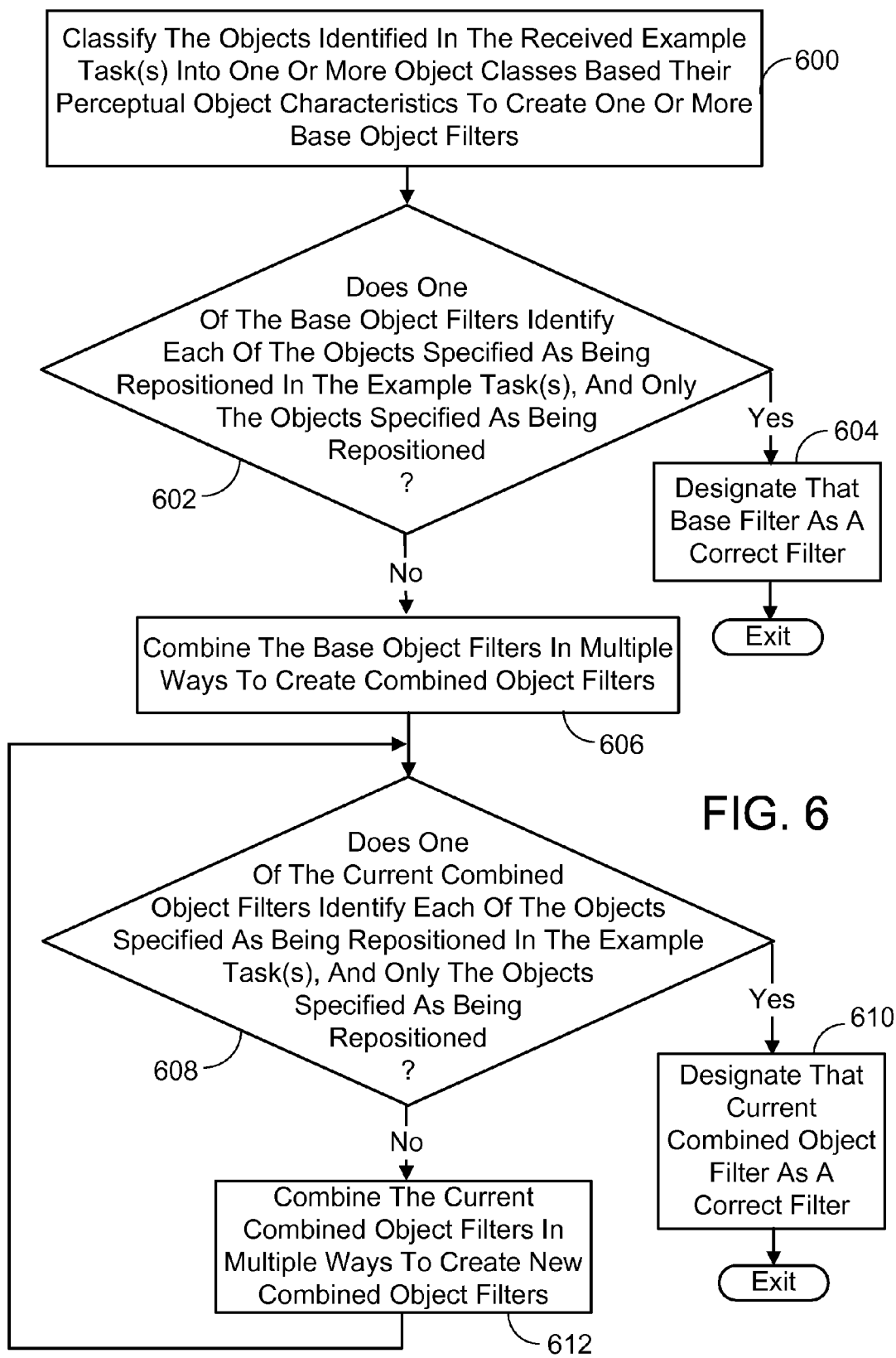
FIG. 6 is a flow diagram illustrating an exemplary embodiment, in simplified form, of a process for designating correct object filters.

In view of the foregoing, in one general implementation outlined in FIG. 6, the objects identified in the received example task or tasks are classified into one or more object classes based on their perceptual object characteristics to create one or more base object filters (process action 600). It is then determined if one of the base object filters identifies each of the objects specified as being repositioned in the reposition portion of the scene-reposition pairs in the received example task or tasks, and only the objects specified as being repositioned (process action 602). Whenever this is true, that base filter is designated as a correct filter (process action 604), and the process ends.

However, whenever it is determined that none of the base object filters identifies each of the objects specified as being repositioned in the reposition portion of the scene-reposition pairs in the received example task or tasks, and only the objects specified as being repositioned, the base object filters are combined in multiple ways to create combined object filters (process action 606). It is then determined if one of the current combined object filters identifies each of the objects specified as being repositioned in the reposition portion of the scene-reposition pairs in the received example task or tasks, and only the objects specified as being repositioned (process action 608). Whenever it is determined that one of the current combined object filters identifies each of these objects, that current combined object filter is designated as the correct filter (process action 610), and the process ends. If not, the current combined object filters are combined in multiple ways to create new combined object filters (process action 612), and process actions 608 through 612 are repeated as appropriate, until one of the current combined object filters has been designated as the correct filter.

As a result of the foregoing object filter generation process, the number of filters can be quite large. To manage the search, in one implementation, the filters are scored according to the number of false positives and false negatives. Then, those selecting the correct objects but including incorrect objects are combined with the negation of filters selecting only incorrect objects. More particularly, for each object filter being combined, the number of objects specified as being repositioned in the reposition portion of the scene-reposition pairs in the received example task or tasks that the object filter correctly identifies is computed, as well as the number of the objects the object filter incorrectly identifies. Then, for an object filter determined to correctly identify some of the objects specified as being repositioned in the reposition portion of the scene-reposition pairs in the received example task or tasks, but also incorrectly identify one of more of the objects, it is respectively combined with ones of the object filters that has been determined to incorrectly identify one or more of the object and not correctly identify any of the objects. This is accomplished using the logical NOT operator.

Similarly, in one implementation, pairs of filters selecting only correct objects are logically or'd together. More particularly, for an object filter determined to correctly identify some, but not all of the objects specified as being repositioned in the reposition portion of the scene-reposition pairs in the received example task or tasks, but also not incorrectly identify any of said objects, it is respectively combined with ones of the object filters that has been likewise determined to correctly identify some, but not all of the objects specified as being repositioned in said reposition portion of the scene-reposition pairs in the received example task or tasks, but also not incorrectly identify any of said objects. This is accomplished using the logical OR operator.

1.4.3 Populating Reposition Primitives

In one implementation, for each object specified as being repositioned in the reposition portion of the aforementioned scene-reposition pairs in the received example task or tasks, each of a group of prescribed reposition primitives is populated with the object filter associated with the object, and a distinct destination location or orientation. These populated reposition primitives form the basis of the candidate robotic task programs.

In general, the reposition primitives define groupings of objects in destination locations or orientations. For example, "Distribute two of each color to these three bins", written in the previously-described exemplary DSL as:

things ['color @] 2 takebygroup
$[[x_1, y_1, \theta_1] [x_2, y_2, \theta_2] [x_3, y_3, \theta_3]]$ distribute, groups (distributes) objects (two of each color) in destination locations (three bins). Essentially, objects may be grouped by a property and then groups therein may be restricted to a maximum size. This allows for very general task descriptions depending on relationships between object properties rather than on particular property values.

1.4.3.1 Sorting

One class of tasks is that of sorting. For this, some or all of the objects of particular classes are moved to particular location(s); or one or more classes of objects are each moved to one or separate locations. The attributes distinguishing the classes are learned and the destination locations or orientation (or both) are also learned.

In general, sorting involves, for each distinct destination, finding an object filter expression to separate the subset of objects having been moved there from the set of available objects. Reposition primitives of the form "Move all the <filter> objects to location (or orientation) A" are generated. It may be that the user intended to move a particular number of objects within a class to the destination. To cover this possibility, reposition primitives of the following form are generated, "Move <n> of the <filter> objects to location (or orientation) A". Any combination of these reposition primitives may be generated to satisfy sorting any number of (or all) objects of one or more class to one or more locations.

1.4.3.2 Distributing

Another class of tasks is that of distributing objects to a sequence of locations or orientations. A set of locations or orientations is chosen from the example tasks and a similar procedure to that of sorting is performed to find a filter expression selecting the objects moved to those destinations. Not knowing which series of locations or orientations constitute a "set" in the user's mind, all possible intervals are explored within the sequence of example moves. For each interval, a set of filters is found that is consistent with the objects moved. For each combination a reposition primitives of the form "Distribute the <filter> objects to locations A, B, C . . . " is generated.

1.4.3.3 Clustering

With regard to the aforementioned distinct destination location or orientation, it is noted that the destination orientation, or destination location, or both received in the reposition portion of a scene-reposition pair may not be precise. For example, assume the destination pose is demonstrated by a user either virtually on a display or using an actual robot. Owing to the inaccuracies inherent in such demonstrations, the destination location, or orientation, or both might vary from what was intended. For example, a user might intend for two different objects to be placed in the same destination location, but actually place them in different (albeit proximate) locations.

In view of the foregoing, in one implementation, destination locations and orientations received in the reposition portion of scene-reposition pairs are clustered to find distinct locations or orientations. This can be accomplished, both within a single example task and/or across examples. In one implementation, a simple variance threshold is used to determine if there is but one location. In another implementation, a k-means procedure (with a Euclidean distance function) is used to cluster. A silhouette score (i.e., a measure of cluster quality) is given for increasing k-values with a minimum relative improvement needed to continue increasing k.

It is further noted that clustering can be used to produce property value ranges used during filter synthesis. A similar process with a simple difference distance function is used for this object characteristic clustering. However, in this latter case clusters across *all* k-values having a minimum silhouette score improvement are kept. This results in many sets of clusters to explore.

1.4.4 Generation Process

Figure 7:
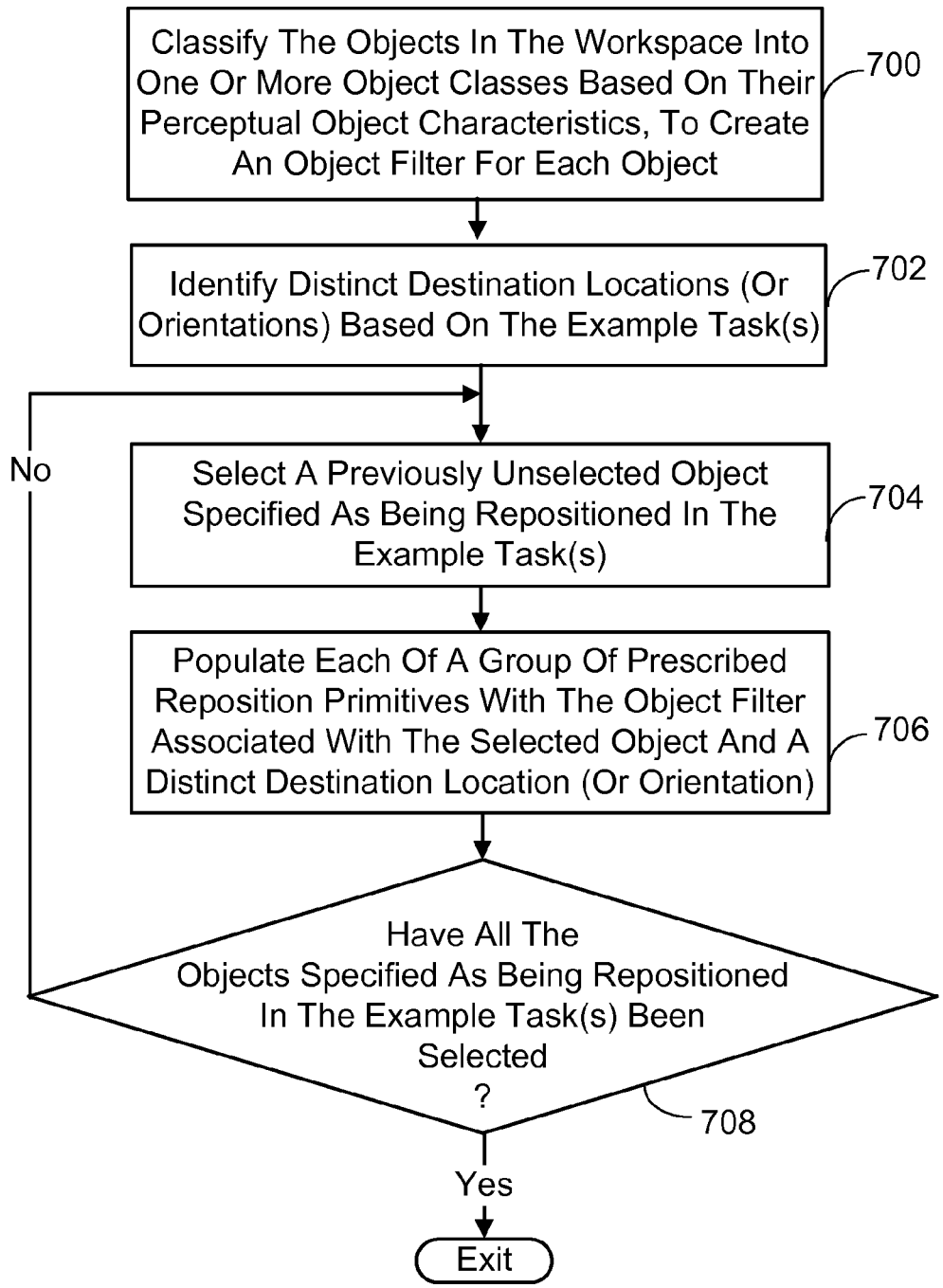
FIG. 7 is a flow diagram illustrating an exemplary embodiment, in simplified form, of a process for generating one or more candidate robotic task programs.

In view of the foregoing, in one implementation, generating one or more candidate robotic task programs is accomplished as follows. Referring to FIG. 7, the objects in the workspace (as identified in the scene portion of the scene-reposition pairs in the received example task or tasks) are classified into one or more object classes based on their perceptual object characteristics, to create an object filter for each object (process action 700). Distinct destination locations (or orientations) are then identified based on the reposition portion of the scene-reposition pairs in the received example task or tasks (process action 702). Next, a previously unselected object specified as being repositioned in the reposition portion of the scene-reposition pairs in the received example task or tasks is selected (process action 704). Each of a group of prescribed reposition primitives is then populated with the object filter associated with the selected object and a distinct destination location (or orientation) in process action 706. It is then determined if all the objects specified as being repositioned in the reposition portion of the scene-reposition pairs in the received example task or tasks have been selected (process action 708). If not, process actions 704 through 708 are repeated. Otherwise the process ends.

Figure 8A:
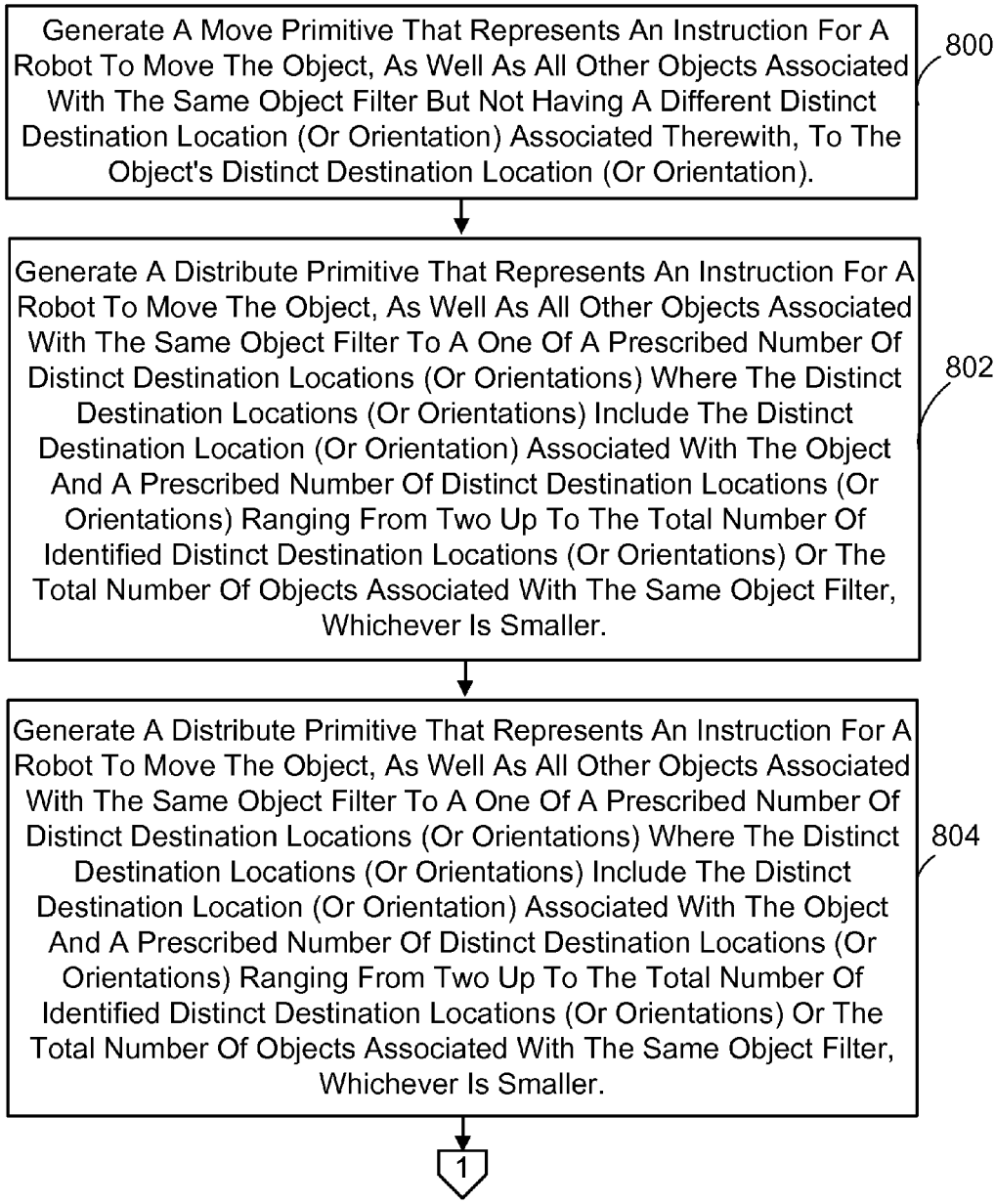

Referring to FIGS. 8A-B, the aforementioned population of each of a group of prescribed reposition primitives with an object's distinct destination location (or orientation) and the object filter associated with the object, involves the following. As shown in process action 800, in one implementation, a move primitive is generated that represents an instruction for a robot to move the object, as well as all other objects associated with the same object filter but not having a different distinct destination location (or orientation) associated therewith, to the object's distinct destination location (or orientation).

In addition, in one implementation shown in process action 802, for each number in a sequence of numbers ranging between zero and the total number of objects associated with the same object filter and not having a different distinct destination location (or orientation) associated therewith, a number-limited move primitive is generated which represents an instruction for a robot to move the object, as well as the number of other objects associated with the same object filter and not having a different distinct destination location (or orientation) associated therewith, to the object's distinct destination location (or orientation).

In addition, in one implementation shown in process action 804, a distribute primitive is generated that represents an instruction for a robot to move the object, as well as all other objects associated with the same object filter to a one of a prescribed number of distinct destination locations (or orientations). The distinct destination locations (or orientations) include the distinct destination location (or orientation) associated with the object and a prescribed number of distinct destination locations (or orientations) ranging from two up to the total number of identified distinct destination locations (or orientations) or the total number of objects associated with the same object filter, whichever is smaller.

In addition, in one implementation shown in process action 806, for each number in a sequence of numbers ranging between zero and the total number of objects associated with the same object filter, a number-limited distribute primitive is generated that represents an instruction for a robot to move the object, as well as the number of other objects associated with the same object filter to a one of a prescribed number of distinct destination locations (or orientations). The distinct destination locations (or orientations) include the distinct destination location (or orientation) associated with the object and the prescribed number of distinct destination locations (or orientations) ranging from two up to the total number of identified distinct destination locations (or orientations) or the total number of objects associated with the same object filter, whichever is smaller.

The result of this generation process can be a large number of candidate programs (e.g., hundreds of thousands). However, all these candidate programs can be evaluated in a short period of time (e.g., several seconds).

1.5 Ranking Candidate Robotic Task Programs

The previously-described scene-reposition pairs are essentially input/output pairs defining an initial pose and a destination pose for one or more objects. Candidate robotic task programs are executed against the inputs and the result is compared with the expected outputs. As indicated previously, in one implementation the degree to which a candidate program would cause the robot to reposition objects in a manner indicated by the scene-reposition pair or pairs of the received example task or tasks is used to establish a rank for that candidate program.

However, it is believed that often multiple candidates will be assigned the same rank. Thus, it is possible that there may be more than one candidate program having the highest rank. For example, it might be found that multiple candidate programs satisfy all the scene-reposition pairs of the received example task or tasks. In one implementation, this tie is resolved by further ranking the candidate programs having the highest rank according to their complexity, with simpler programs being ranked higher than more complex programs. The simplest, and often the most general, solution is then selected as the highest ranking candidate program. In one implementation, complexity of a program is measured by its length. Thus, shorter programs would be considered simpler. In another implementation, programs are scored by the weighted number of nodes in an abstract syntax tree (AST). Most nodes receive a weight of 1, but a few primitive and predefined compounds that are more complex (and therefore less desirable) are assigned a higher weight. It is further noted that the weights can be adjusted to allow for domain-specific rank biasing favoring certain kinds of programs. These weights can also be adjusted to introduce a bias favoring programs or sub-programs that were generated by the user in previous engagements. It is also noted that in one implementation, the candidate programs are further ranked according to the past history of tasks specified by users. If a candidate program was specified by users more than another, it would be assigned a higher ranking for this component of the ranking process.

Figure 9:
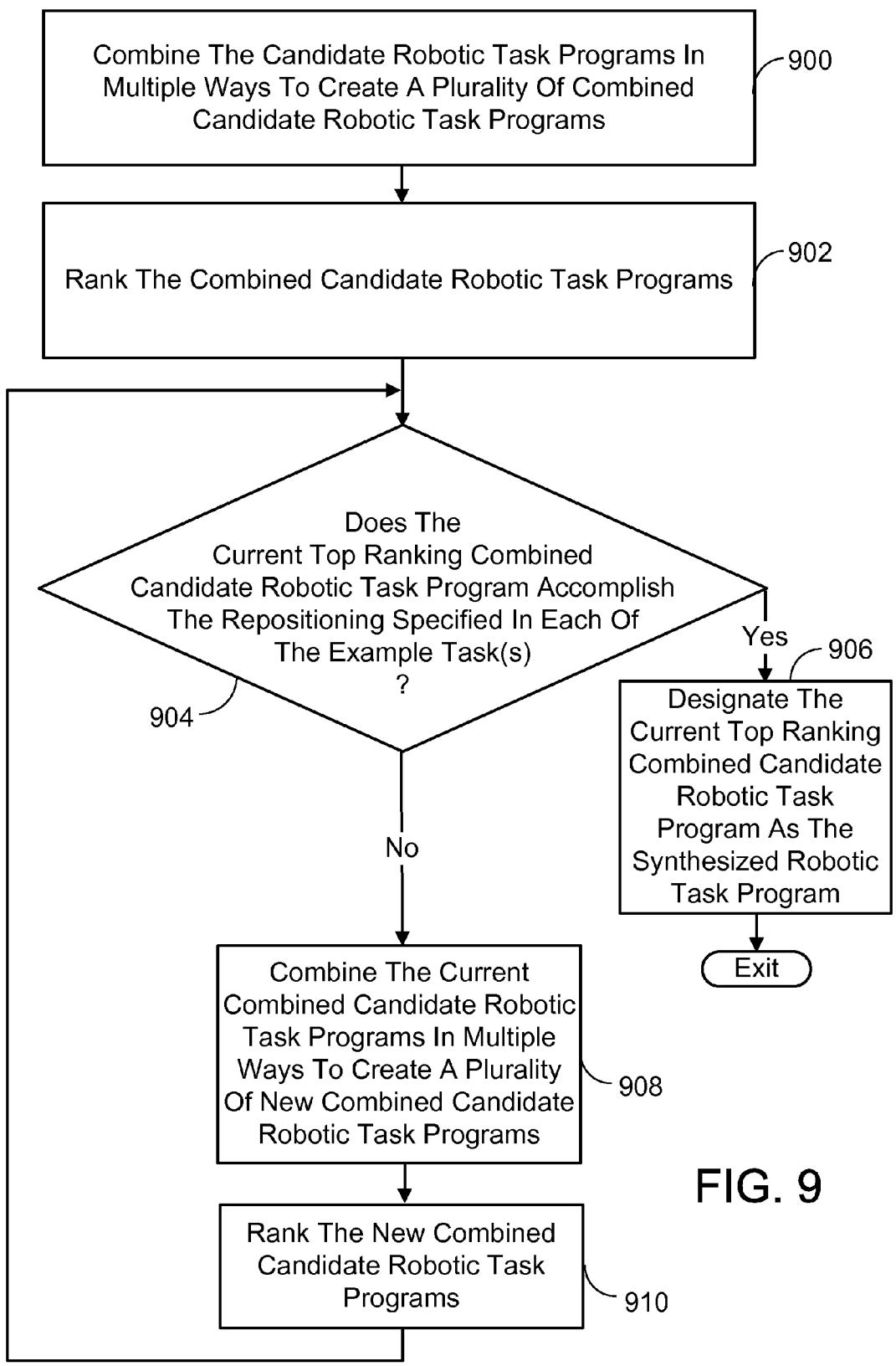
FIG. 9 is a flow diagram illustrating an exemplary embodiment, in simplified form, of a process for combining and ranking candidate robotic task programs whenever more than one candidate robotic task program has been generated and the top ranking candidate robotic task program does not accomplish the repositioning specified in each of the scene-reposition pairs in the received example task or tasks.

While the above-described first iteration of generating candidate robot task programs might produce one or more programs that satisfy all scene-reposition pair or pairs of the received example task or tasks, this may also not be the case. Rather, it is possible that none of the generated programs satisfy all scene-reposition pair or pairs. In this latter case, the candidate robotic task programs are combined and re-tested. More particularly, referring to FIG. 9, whenever more than one candidate robotic task program has been generated and the top ranking candidate robotic task program does not accomplish the repositioning specified in each of the scene-reposition pairs in the received example task or tasks, in one implementation the following process is employed. First, the previously-generated candidate robotic task programs are combined in multiple ways to create a plurality of combined candidate robotic task programs (process action 900). The combined candidate robotic task programs are then ranked based on the degree to which a candidate program would cause the robot to reposition objects in a manner indicated by the scene-reposition pair or pairs of the received example task or tasks (process action 902). It is next determined if the current top ranking combined candidate robotic task program accomplishes the repositioning specified in each of the scene-reposition pairs in the received example task or tasks (process action 904). If so, the current top ranking combined candidate robotic task program is designated as the synthesized robotic task program (process action 906), and the process ends. If, however, the current top ranking combined candidate robotic task program does not accomplish the repositioning specified in each of the scene-reposition pairs in the received example task or tasks, then the current combined candidate robotic task programs are combined in multiple ways to create a plurality of new combined candidate robotic task programs (process action 908). These new combined candidate robotic task programs are ranked based on the degree to which a candidate program would cause the robot to reposition objects in a manner indicated by the scene-reposition pair or pairs of the received example task or tasks (process action 910). Then, process actions 904 through 910 are repeated as appropriate until the current top ranking combined candidate robotic task program has been designated as the synthesized robotic task program in process action 906.

In one implementation, the candidate robotic task programs are combined in a manner similar to the previously-described object filters. More particularly, the candidate programs are combined in pairs using the logical operators AND, or OR, or NOT, respectively. Thus, in one version, each candidate program is respectively combined with each of the other candidate programs, one at a time, using first the AND operator, then the OR operator and finally the NOT operator.

1.6 Negative Examples

Once the robotic control program is synthesized, it can be played back to the user for validation either virtually using a display or actually using a robot. The program is deemed validated if the user is satisfied with the operation of the synthesized program. However, if the user is not satisfied with the operation of the program, additional repositioning examples could be provided and the program re-synthesized using the previously-described methods based on the previous examples and the new examples. This could continue until the last-synthesized robotic control program is played and the user is satisfied with its operation. However, in addition to, or instead of, additional repositioning examples being provided, in one implementation, the user can also designate the last-synthesized robotic control program as representing a negative example. In such a case, when the robotic control program is re-synthesized not only are the positive repositioning examples (new and old) taken into consideration, but also the designated negative example. As a result, the re-synthesized program will not exhibit the behavior deemed incorrect by the user. This cycle of positive examples, negative feedback and learning is continued until the user is satisfied with the operation of the program.

Thus, in one implementation, if a task is received that is designated as a negative example task, generating one or more candidate robotic task programs includes eliminating candidate robotic task programs that would cause the robot to reposition objects in a manner indicated by the negative example task.

2.0 Exemplary Operating Environments

Figure 10:
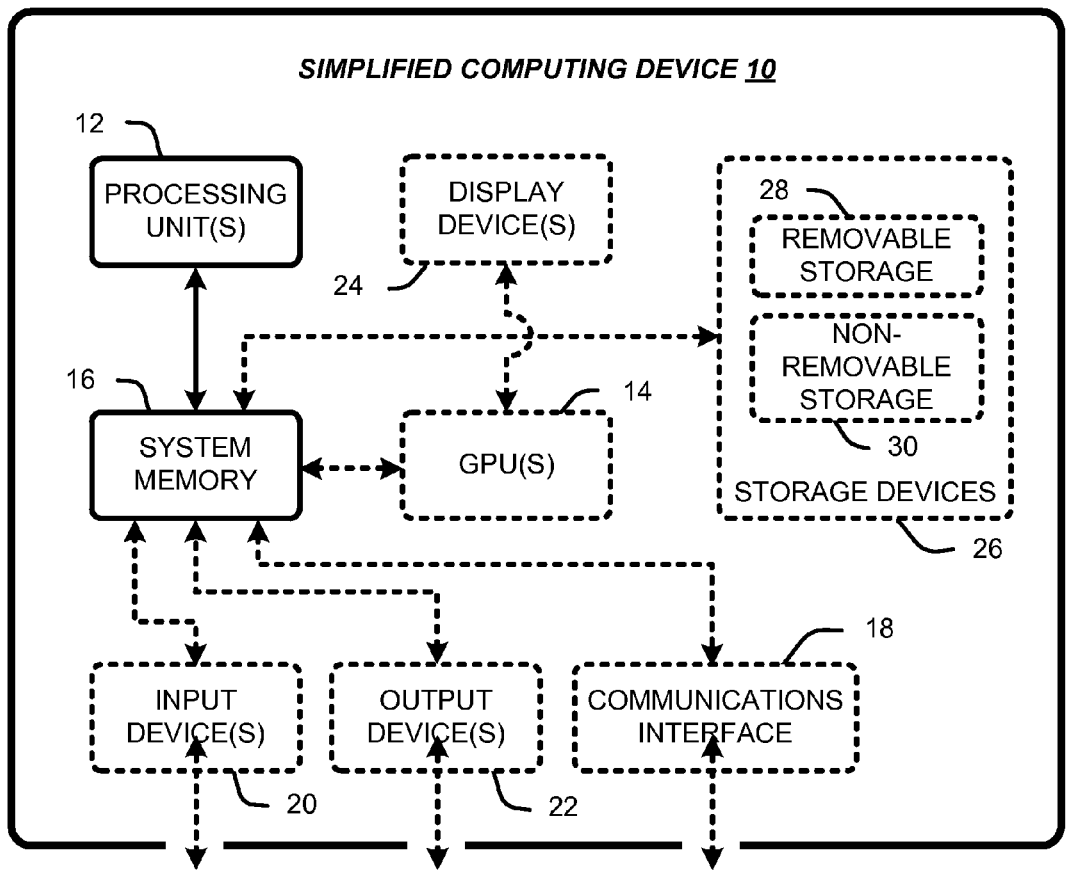
FIG. 10 is a diagram depicting a general purpose computing device constituting an exemplary system for implementing robotic task program synthesis embodiments described herein.

The robotic task program synthesis embodiments described herein are operational within numerous types of general purpose or special purpose computing system environments or configurations. FIG. 10 illustrates a simplified example of a general-purpose computer system on which various embodiments and elements of the robotic task program synthesis, as described herein, may be implemented. It is noted that any boxes that are represented by broken or dashed lines in the simplified computing device 10 shown in FIG. 10 represent alternate embodiments of the simplified computing device. As described below, any or all of these alternate embodiments may be used in combination with other alternate embodiments that are described throughout this document. The simplified computing device 10 is typically found in devices having at least some minimum computational capability such as personal computers (PCs), server computers, handheld computing devices, laptop or mobile computers, communications devices such as cell phones and personal digital assistants (PDAs), multiprocessor systems, microprocessor-based systems, set top boxes, programmable consumer electronics, network PCs, minicomputers, mainframe computers, and audio or video media players.

To allow a device to implement the robotic task program synthesis embodiments described herein, the device should have a sufficient computational capability and system memory to enable basic computational operations. In particular, the computational capability of the simplified computing device 10 shown in FIG. 10 is generally illustrated by one or more processing unit(s) 12, and may also include one or more graphics processing units (GPUs) 14, either or both in communication with system memory 16. Note that that the processing unit(s) 12 of the simplified computing device 10 may be specialized microprocessors (such as a digital signal processor (DSP), a very long instruction word (VLIW) processor, a field-programmable gate array (FPGA), or other micro-controller) or can be conventional central processing units (CPUs) having one or more processing cores.

In addition, the simplified computing device 10 shown in FIG. 10 may also include other components such as a communications interface 18. The simplified computing device 10 may also include one or more conventional computer input devices 20 (e.g., pointing devices, keyboards, audio (e.g., voice) input devices, video input devices, haptic input devices, gesture recognition devices, devices for receiving wired or wireless data transmissions, and the like). The simplified computing device 10 may also include other optional components such as one or more conventional computer output devices 22 (e.g., display device(s) 24, audio output devices, video output devices, devices for transmitting wired or wireless data transmissions, and the like). Note that typical communications interfaces 18, input devices 20, output devices 22, and storage devices 26 for general-purpose computers are well known to those skilled in the art, and will not be described in detail herein.

The simplified computing device 10 shown in FIG. 10 may also include a variety of computer-readable media. Computer-readable media can be any available media that can be accessed by the computer 10 via storage devices 26, and can include both volatile and nonvolatile media that is either removable 28 and/or non-removable 30, for storage of information such as computer-readable or computer-executable instructions, data structures, program modules, or other data. Computer-readable media includes computer storage media and communication media. Computer storage media refers to tangible computer-readable or machine-readable media or storage devices such as digital versatile disks (DVDs), compact discs (CDs), floppy disks, tape drives, hard drives, optical drives, solid state memory devices, random access memory (RAM), read-only memory (ROM), electrically erasable programmable read-only memory (EEPROM), flash memory or other memory technology, magnetic cassettes, magnetic tapes, magnetic disk storage, or other magnetic storage devices.

Retention of information such as computer-readable or computer-executable instructions, data structures, program modules, and the like, can also be accomplished by using any of a variety of the aforementioned communication media (as opposed to computer storage media) to encode one or more modulated data signals or carrier waves, or other transport mechanisms or communications protocols, and can include any wired or wireless information delivery mechanism. Note that the terms "modulated data signal" or "carrier wave" generally refer to a signal that has one or more of its characteristics set or changed in such a manner as to encode information in the signal. For example, communication media can include wired media such as a wired network or direct-wired connection carrying one or more modulated data signals, and wireless media such as acoustic, radio frequency (RF), infrared, laser, and other wireless media for transmitting and/or receiving one or more modulated data signals or carrier waves.

Furthermore, software, programs, and/or computer program products embodying some or all of the various robotic task program synthesis embodiments described herein, or portions thereof, may be stored, received, transmitted, or read from any desired combination of computer-readable or machine-readable media or storage devices and communication media in the form of computer-executable instructions or other data structures.

Finally, the robotic task program synthesis embodiments described herein may be further described in the general context of computer-executable instructions, such as program modules, being executed by a computing device. Generally, program modules include routines, programs, objects, components, data structures, and the like, that perform particular tasks or implement particular abstract data types. The robotic task program synthesis embodiments may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Additionally, the aforementioned instructions may be implemented, in part or in whole, as hardware logic circuits, which may or may not include a processor.

3.0 Other Embodiments

In the foregoing description of embodiments of the robotic task program synthesis it was mentioned that the received example tasks can be generated via user demonstrations done either virtually on a display or using an actual robot. This has an advantage when the user is not a competent roboticist and/or programmer. All the user has to do is demonstrate tasks of the type it is desired for the robot to perform, and a program to do so is automatically synthesized. However, in one embodiment, user interaction in the program synthesis can be more extensive should the user have the requisite skills to review and possibly modify a synthesized program.

As described in the foregoing sections pertaining to the domain specific language (DSL), the synthesized robotic task program is in many ways human readable. As such a user versed in the DSL could review the synthesized program and make changes as necessary without having to provide further example tasks or negative example task designations. Further, in one implementation, the changes to the program can include adding object metadata to more precisely define the objects to be repositioned. This will make the affected objects more readily identifiable in real environments and conditions, and more distinguishable from other objects.

It is further noted that any or all of the aforementioned embodiments throughout the description may be used in any combination desired to form additional hybrid embodiments. In addition, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Wherefore, what is claimed is:

1. A computer-implemented process for synthesizing a robotic task program, comprising:
   using a computer to perform the following process actions:
   receiving one or more example tasks, each example task comprising a scene-reposition pair, said scene portion of a scene-reposition pair comprising a collection of objects characterized by their orientation, location and perceptual object characteristics, and representing a starting configuration of the objects in a workspace associated with a robot, and said reposition portion of a scene-reposition pair comprising repositioning data for one or more of said objects, wherein the repositioning data for an object comprises a destination orientation, or destination location, or both and is indicative of a task that the robot is to perform on the various objects in the workspace;
   generating a plurality of complete candidate robotic task programs, each program comprising task instructions for causing the robot to reposition one or more of said objects in the workspace, and wherein each program represents a different complete set of task instructions consistent with the received example task or tasks;
   ranking the plurality of complete candidate robotic task programs generated based on the degree to which a candidate program causes the robot to reposition objects in a manner indicated by the scene-reposition pair or pairs of the received example task or tasks; and
   whenever the top ranking candidate robotic task program accomplishes the repositioning specified in each of the scene-reposition pairs in the received example task or tasks, designating the top ranking candidate robotic task program as the synthesized robotic task program.

2. The process of claim 1, wherein the process action of generating a plurality of complete candidate robotic task programs, comprises the actions of:
   classifying said objects in the workspace into one or more object classes based on their perceptual object characteristics to create one or more base object filters;
   determining if one of the base object filters identifies each of the objects specified as being repositioned in said reposition portion of the scene-reposition pairs in the received example task or tasks, and only the objects specified as being repositioned; and
   whenever it is determined that one of the base object filters identifies each of the objects specified as being repositioned in said reposition portion of the scene-reposition pairs in the received example task or tasks, and only the objects specified as being repositioned, designating that base filter as a correct filter.

3. The process of claim 2, further comprising, whenever it is determined that none of the base object filters identifies each of the objects specified as being repositioned in said reposition portion of the scene-reposition pairs in the received example task or tasks, and only the objects specified as being repositioned:
   a) combining the base object filters in multiple ways to create combined object filters;
   b) determining if one of the current combined object filters identifies each of the objects specified as being repositioned in said reposition portion of the scene-reposition pairs in the received example task or tasks, and only the objects specified as being repositioned;
   c) whenever it is determined that one of the current combined object filters identifies each of the objects specified as being repositioned in said reposition portion of the scene-reposition pairs in the received example task or tasks, and only the objects specified as being repositioned, designating that current combined object filter as the correct filter;
   d) whenever it is determined that none of the current combined object filters identifies each of the objects specified as being repositioned in said reposition portion of the scene-reposition pairs in the received example task or tasks, and only the objects specified as being repositioned,
combining the current combined object filters in multiple ways to create new combined object filters, and repeating process actions b) through d) as appropriate, until one of the current combined object filters has been designated as the correct filter.

4. The process of claim 3, wherein the process actions of combining base object filters or current combined object filters, comprises an action of combining each object filter in a combination using one of the logical operators AND, or OR, or NOT.

5. The process of claim 3, wherein the process actions of combining base object filters or current combined object filters, further comprises:
for each object filter being combined, determining the number of objects specified as being repositioned in said reposition portion of the scene-reposition pairs in the received example task or tasks that the object filter correctly identifies and the number of said objects the object filter incorrectly identifies;
for an object filter determined to correctly identify some of the objects specified as being repositioned in said reposition portion of the scene-reposition pairs in the received example task or tasks, but also incorrectly identify one of more of said objects, respectively combining the object filter with ones of the object filters that has been determined to incorrectly identify one of more of said objects and not correctly identify any of said objects, using a logical NOT operator.

6. The process of claim 3, wherein the process actions of combining base object filters or current combined object filters, further comprises:
for each object filter being combined, determining the number of objects specified as being repositioned in said reposition portion of the scene-reposition pairs in the received example task or tasks that the object filter correctly identifies and the number of said objects the object filter incorrectly identifies;
for an object filter determined to correctly identify some, but not all of the objects specified as being repositioned in said reposition portion of the scene-reposition pairs in the received example task or tasks, but also not incorrectly identify any of said objects, respectively combining the object filter with ones of the object filters that has been likewise determined to correctly identify some, but not all of the objects specified as being repositioned in said reposition portion of the scene-reposition pairs in the received example task or tasks, but also not incorrectly identify any of said objects, using a logical OR operator.

7. The process of claim 2, wherein the process action of classifying said objects in the workspace into one or more object classes based on their perceptual object characteristics to create one or more base object filters, comprises classifying said objects into one or more object classes comprising size, or shape, or aspect ratio, or color.

8. The process of claim 2, wherein the process action of classifying said objects in the workspace into one or more object classes based on their perceptual object characteristics to create one or more base object filters, comprises, for a perceptual object characteristic that exhibits a discrete value, an action of creating a base object filter that identifies objects exhibiting the perceptual object characteristic having that discrete value.

9. The process of claim 2, wherein the process action of classifying said objects in the workspace into one or more object classes based their perceptual object characteristics to create one or more base object filters, comprises, for a perceptual object characteristic that exhibits a continuous value, an action of creating a base object filter that identifies objects exhibiting the perceptual object characteristic that falls within a prescribed range of values, wherein said prescribed range of continuous values comprises values falling within a range starting with the minimum value of said perceptual object characteristic exhibited by objects specified as being repositioned in said reposition portion of the scene-reposition pairs in the received example task or tasks, and ending with the maximum value of said perceptual object characteristic exhibited by objects specified as being repositioned in said reposition portion of the scene-reposition pairs in the received example task or tasks.

10. The process of claim 2, wherein the process action of classifying said objects in the workspace into one or more object classes based on their perceptual object characteristics to create one or more base object filters, comprises, for a perceptual object characteristic that exhibits a discrete value, an action of creating a base object filter that identifies objects not exhibiting the perceptual object characteristic having that discrete value.

11. The process of claim 2, wherein the process action of classifying said objects in the workspace into one or more object classes based on their perceptual object characteristics to create one or more base object filters, comprises, for a perceptual object characteristic that exhibits a continuous value, an action of creating a base object filter that identifies objects not exhibiting the perceptual object characteristic that falls within a prescribed range of continuous values, wherein said prescribed range of continuous values comprises values falling within a range starting with the minimum value of said perceptual object characteristic exhibited by objects specified as being repositioned in said reposition portion of the scene-reposition pairs in the received example task or tasks, and ending with the maximum value of said perceptual object characteristic exhibited by objects specified as being repositioned in said reposition portion of the scene-reposition pairs in the received example task or tasks.

12. The process of claim 2, wherein the process action of classifying said objects in the workspace into one or more object classes based on their perceptual object characteristics to create one or more base object filters, comprises, for a perceptual object characteristic that exhibits a continuous value, an action of creating a plurality of base object filters each of which identifies objects exhibiting the perceptual object characteristic that falls within one of a plurality of a prescribed ranges of continuous values, wherein a clustering of the continuous values exhibited by the perceptual object characteristic of said collection of objects specified in the scene portion of the scene-reposition pairs in the received example task or tasks defines a series of continuous value ranges, and wherein each of said prescribed ranges of continuous values comprises one of said series of continuous value ranges.

13. A system for synthesizing a robotic task program, comprising:
one or more computing devices, wherein said computing devices are in communication with each other via a computer network whenever there are multiple computing devices; and
a computer program having program modules executable by the one or more computing devices, the one or more computing devices being directed by the program modules of the computer program to, receive one or more example tasks, each example task comprising a scene-reposition pair, said scene portion of a scene-reposition pair comprising a collection of objects characterized by their orientation, location and perceptual object characteristics, and representing a starting configuration of the objects in a workspace associated with a robot, and said reposition portion of a scene-reposition pair comprising repositioning data for one or more of said objects, wherein the repositioning data for an object comprises a destination orientation, or destination location, or both and is indicative of a task that the robot is to perform on the object in the workspace, generate a plurality of complete candidate robotic task programs in a domain specific language tailored to robotic manipulation tasks, each program comprising task instructions for causing the robot to reposition one or more of said objects in the workspace, and wherein each program represents a different complete set of task instructions consistent with the received example task or tasks, rank the plurality of complete candidate robotic task programs generated based on the degree to which a candidate program causes the robot to reposition objects in a manner indicated by the scene-reposition pair or pairs of the received example task or tasks, and whenever the top ranking candidate robotic task program accomplishes the repositioning specified in each of the scene-reposition pairs in the received example task or tasks, designate the top ranking candidate robotic task program as the synthesized robotic task program.

14. The system of claim 13, wherein the program module for generating a plurality of complete candidate robotic task programs, comprises sub-modules for:

classifying said objects in the workspace into one or more object classes based their perceptual object characteristics to create an object filter for each object which identifies that object;

identifying distinct destination locations based on said reposition portion of the scene-reposition pairs in the received example task or tasks; and for each object specified as being repositioned in said reposition portion of the scene-reposition pairs in the received example task or tasks, populating each of a group of prescribed reposition primitives with the object filter associated with the object and a distinct destination location.

15. The system of claim 14, wherein the sub-module for populating each of said group of prescribed reposition primitives with the object's distinct destination location and the object filter associated with the object, comprises sub-modules for:

generating a move primitive which represents an instruction for a robot to move the object, as well as all other objects associated with the same object filter and not having a different distinct destination location associated therewith, to the object's distinct destination location;

for each number in a sequence of numbers ranging between zero and the total number of objects associated with the same object filter and not having a different distinct destination location associated therewith, generating a number-limited move primitive which represents an instruction for a robot to move the object, as well as said number of other objects associated with the same object filter and not having a different distinct destination location associated therewith, to the object's distinct destination location;

generating a distribute primitive which represents an instruction for a robot to move the object, as well as all other objects associated with the same object filter to one of a prescribed number of distinct destination locations, said distinct destination locations including the distinct destination location associated with the object and said prescribed number of distinct destination locations ranging from two up to the total number of identified distinct destination locations or the total number of objects associated with the same object filter, whichever is smaller; and for each number in a sequence of numbers ranging between zero and the total number of objects associated with the same object filter, generating a number-limited distribute primitive which represents an instruction for a robot to move the object, as well as said number of other objects associated with the same object filter to a one of a prescribed number of distinct destination locations, said distinct destination locations including the distinct destination location associated with the object and said prescribed number of distinct destination locations ranging from two up to the total number of identified distinct destination locations or the total number of objects associated with the same object filter, whichever is smaller.

16. The system of claim 13, wherein the program module for generating a plurality of complete candidate robotic task programs, comprises sub-modules for:

classifying said objects in the workspace into one or more object classes based on their perceptual object characteristics to create an object filter for each object which identifies that object;

identifying distinct destination orientations based on said reposition portion of the scene-reposition pairs in the received example task or tasks; and for each object specified as being repositioned in said reposition portion of the scene-reposition pairs in the received example task or tasks, populating each of a group of prescribed reposition primitives with the object filter associated with the object and a distinct destination orientation.

17. The process of claim 16, wherein the process action of populating each of said group of prescribed reposition primitives with the object's distinct destination orientation and the object filter associated with the object, comprises:

generating a move primitive which represents an instruction for a robot to move the object, as well as all other objects associated with the same object filter and not having a different distinct destination orientation associated therewith, to the object's distinct destination orientation;

for each number in a sequence of numbers ranging between zero and the total number of objects associated with the same object filter and not having a different distinct destination orientation associated therewith, generating a number-limited move primitive which represents an instruction for a robot to move the object, as well as said number of other objects associated with the same object filter and not having a different distinct destination orientation associated therewith, to the object's distinct destination orientation;

generating a distribute primitive which represents an instruction for a robot to move the object, as well as all other objects associated with the same object filter to a one of a prescribed number of distinct destination orientations, said distinct destination orientations including the distinct destination orientation associated with the object and said prescribed number of distinct destination orientations ranging from two up to the total number of identified distinct destination orientations or the total number of objects associated with the same object filter whichever is smaller; and for each number in a sequence of numbers ranging between zero and the total number of objects associated with the same object filter, generating a number-limited distribute primitive which represents an instruction for a robot to move the object, as well as said number of other objects associated with the same object filter to a one of a prescribed number of distinct destination orientations, said distinct destination orientations including the distinct destination orientation associated with the object and said prescribed number of distinct destination orientations ranging from two up to the total number of identified distinct destination orientations or the total number of objects associated with the same object filter, whichever is smaller.

18. The system of claim 13, wherein the program module for receiving one or more example tasks, comprises a sub-module for receiving a task that is designated as a negative example task, and wherein the program module for generating one or more candidate robotic task programs, comprises a sub-module for eliminating candidate robotic task programs that causes the robot to reposition objects in a manner indicated by the negative example task.

19. The system of claim 18, wherein whenever more than one candidate robotic task program is found to accomplish the repositioning specified in each of the scene-reposition pairs in the received example task or tasks, the program module for ranking the one or more candidate robotic task programs comprises a sub-module for further ranking these candidate robotic task programs according to their complexity with simpler programs being ranked higher than more complex programs, or according to the past history of tasks specified by users with tasks specified more often by users in the past being ranked higher than tasks specified less often, or both.

20. A computer-implemented process for synthesizing a robotic task program, comprising:

using a computer to perform the following process actions:

receiving one or more example tasks, each example task comprising a scene-reposition pair, said scene portion of a scene-reposition pair comprising a collection of objects characterized by their orientation, location and perceptual object characteristics, and representing a starting configuration of the objects in a workspace associated with a robot, and said reposition portion of a scene-reposition pair comprising repositioning data for one or more of said objects, wherein the repositioning data for an object comprises a destination orientation, or destination location, or both and is indicative of a task that the robot is to perform on the object in the workspace;

generating one or more candidate robotic task programs, each program comprising task instructions for causing the robot to reposition one or more of said objects in the workspace, and wherein each program represents a different set of task instructions consistent with the received example task or tasks;

ranking the one or more candidate robotic task programs generated based on the degree to which a candidate program causes the robot to reposition objects in a manner indicated by the scene-reposition pair or pairs of the received example task or tasks;

whenever the top ranking candidate robotic task program accomplishes the repositioning specified in each of the scene-reposition pairs in the received example task or tasks, designating the top ranking candidate robotic task program as the synthesized robotic task program; and whenever more than one candidate robotic task program has been generated and the top ranking candidate robotic task program does not accomplish the repositioning specified in each of the scene-reposition pairs in the received example task or tasks, a) combining the candidate robotic task programs in multiple ways to create a plurality of combined candidate robotic task programs, b) ranking the combined candidate robotic task programs based on the degree to which a candidate program causes the robot to reposition objects in a manner indicated by the scene-reposition pair or pairs of the received example task or tasks, c) whenever a current top ranking combined candidate robotic task program accomplishes the repositioning specified in each of the scene-reposition pairs in the received example task or tasks, designating the current top ranking combined candidate robotic task program as the synthesized robotic task program, and d) whenever a current top ranking combined candidate robotic task program does not accomplish the repositioning specified in each of the scene-reposition pairs in the received example task or tasks, combining the current combined candidate robotic task programs in multiple ways to create a plurality of new combined candidate robotic task programs, ranking the new combined candidate robotic task programs based on the degree to which a candidate program causes the robot to reposition objects in a manner indicated by the scene-reposition pair or pairs of the received example task or tasks, and repeating instructions c) and d) as appropriate until the current top ranking combined candidate robotic task program has been designated as the synthesized robotic task program.

* * * * *